United States Patent Office 3,772,399
Patented Nov. 13, 1973

3,772,399
SEPARATION OF 2,6-DIMETHYLNAPHTHALENE FROM 1,5 - DIMETHYLNAPHTHALENE WITH MOLECULAR SIEVE
John A. Hedge, Wilmington, Del., assignor to Sun Research and Development Co., Marcus Hook, Pa., and Teijin Limited, Tokyo, Japan
Continuation-in-part of applications Ser. No. 7,273, Jan. 30, 1970, now Patent No. 3,668,267, and Ser. No. 207,870, Dec. 14, 1971. This application May 25, 1972, Ser. No. 256,863
Int. Cl. C07c 7/12, 15/24
U.S. Cl. 260—674 SA          13 Claims

ABSTRACT OF THE DISCLOSURE

Selective adsorption of 2,6-dimethylnaphthalene from a eutectic mixture with 1,5-dimethylnaphthalene can be obtained with partially dehydrated molecular sieves (crystalline alumino-silicate zeolite). Preferably the Al/Si ratio in the zeolite framework is in the range of 0.2–0.65, more preferred 0.2–0.35 (e.g., type L). The unadsorbed raffinate fraction can be fed to an isomerization step.

CROSS REFERENCE TO RELATED APPLICATIONS

This application is a continuation-in-part of my applications Ser. No. 7,273, filed Jan. 30, 1970, patented on June 6, 1972 as U.S. Pat. 3,668,267, and Ser. No. 207,870, filed Dec. 14, 1971, the entire disclosure of which are hereby incorporated herein by this reference.

Other relevant patents and applications (which show zeolites which can be used as adsorbents in the present invention, or show methods of isomerization or other conversions of dimethylnaphthalenes) are Ser. No. 716,190, filed Mar. 26, 1968 and Ser. No. 211,040, filed Dec. 22, 1971, both of Kirsch, Barmby and Potts (which disclose polyvalent metal exchanged zeolites and methods for activation thereof); U.S. 3,244,758, patented Apr. 5, 1966 of Eberhardt, which shows the preparation of 1,5-dimethylnaphthalene from o-xylene and butadiene; and U.S. 3,336,411, patented Aug. 15, 1967 to Benham, which teaches isomerization of dimethylnaphthalenes using silica-alumina and other catalysts. All of the above-referred to patents and applications are hereby incorporated herein.

BACKGROUND OF THE INVENTION

Molecular sieves have been used to separate distinct classes of organic compounds and have also been used to separate compounds within a given class. The separation of n-paraffins from branched paraffins with 5A molecular sieves is well known. Selective adsorption of aromatics from mixed streams with 10X and 13X sieves is also known. The use of 10X molecular sieves to separate mixtures of aromatics has been disclosed in U.S. Pat. Nos. 3,114,782 issued Dec. 17, 1963 to Fleck et al. and 3,133,126 issued May 12, 1964 to Fleck et al. These patents disclose separations of mixtures of monocyclic aromatics and separation of mixtures of dicyclic aromatics. U.S. Pats. 3,558,732 issued Jan. 26, 1971 and 3,626,020 issued Dec. 7, 1971 to Neuzil, deal with the use of Type X and Y zeolites for separation of a $C_8$ aromatic isomer (e.g., p-xylene) from mixtures of such isomers.

BRIEF DESCRIPTION OF THE INVENTION

Good separations of mixtures of aromatic compounds of similar structure can be achieved, by preferential adsorption of one component of the mixture, utilizing an adsorbent comprising a crystalline alumino-silicate zeolite having a critical pore diameter greater than about 6 A. preferably 6.5 to 15 A., and wherein the chemical formula of the zeolite can be expressed as $$M_x(AlO_2)_x(SiO_2)_y \cdot (H_2O)_z,$$

where $x$, $y$ and $z$ are integers, the ratio $x:y$ being from 0.65 to 0.2 and where M represents sufficient cations (including $H^+$) of metals, metal oxides or metal hydroxides to balance the electronegativity associated with the alumino-silicate framework of the zeolite.

Separation of the eutectic mixture comprising 1,5-dimethylnaphthalene (1,5-DMN) and 2,6-dimethylnaphthalene (2,6-DMN) can be achieved by using the present invention. For example, selective adsorption of 2,6-dimethylnaphthalene from a dimethylnaphthalene concentrate is obtained with Type L molecular sieves which can have an Al/Si ratio in the range of 0.2–0.35.

A complex mixture containing liquid DMN isomers (such as 1,6-DMN) can be utilized instead of a pure binary eutectic mixture.

Liquid, vapor or mixed liquid-vapor phase separation of 2,6-dimethylnaphthalene from 1,5-dimethylnaphthalene, as in a filtrate from 2,6-dimethylnaphthaline crystallization which contains 2,6-DMN and 1,5-DMN in an eutectic ratio (33:67), can be obtained by adsorption with partially dehydrated molecular sieves (crystalline alumino-silicate zeolites). Preferably the Al/Si ratio in the zeolite framework is in the range of 0.2–0.65, more preferred 0.2–0.35 (e.g., Type L). The effective pore openings of the zeolite framework are preferably at least 6 A. in diameter. The unadsorbed raffinate fraction can be fed to an isomerization step, or to a crystallization step.

For example, the unadsorbed raffinate fraction from contact with a zeolite which is selective for adsorption of 2,6-DMN can be passed to an isomerization step to increase the content therein of 2,6-DMN. Selectivity can be improved by controlling the water content of the zeolite (as by the activation procedure, see the applications of Kirsch et al.) or by choice of the types and relative amounts of metal cations and protons which are in exchange positions on the zeolite. The zeolite used can either be selective for 1,5-DMN (e.g., CeHY as in Ser. No. 211,040) or for 2,6-DMN (e.g., KNaL).

By synchronizing the operation of the 3 columns, 2,6-DMN enriched streams can be produced in a continuous manner. In effect, at any given point in time, one column will be eluting raffinate which is rich in 1,5-DMN, one column will be eluting a recycle stream, and one column will be eluting a desorbate which is rich in 2,6-DMN.

Figure 1:
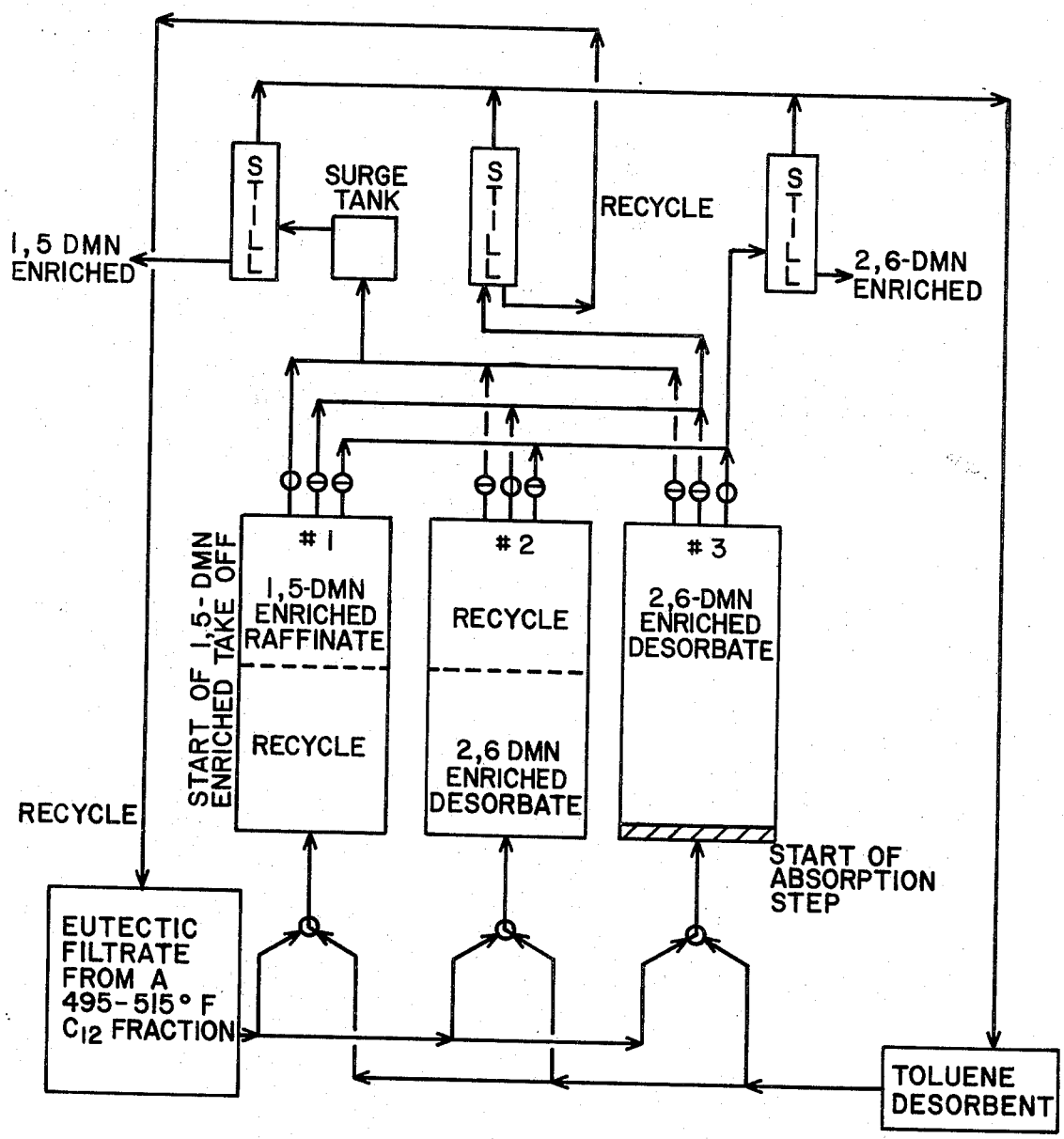
FIG. 1 is a schematic diagram of a process wherein a selective adsorbent for 2,6-DMN is used for separation of an eutectic mixture of 2,6-DMN and 1,5-DMN (which can be present in admixture with other DMN isomers) into a fraction enriched in 2,6-DMN and a fraction enriched in 1,5-DMN.

A preferred feed to this unit consists of eutectic filtrate from a 495–515° F. boiling range $C_{12}$ fraction containing 2,6- and 1,5-DMN. As shown in FIG. 1, this feed is being pumped to column 3. Simultaneously, toluene desorbent is being pumped to columns 1 and 2.

Take off of product from column 1 is 1,5-DMN enriched raffinate. This raffinate stripped of toluene desorbent, can be isomerized to produce more 2,6-DMN.

Take off from column 2 is recycle material, which is stripped of desorbent and recycled to the 495–515° F., $C_{12}$ fraction charge tank.

Take off from column 3 is 2,6-DMN enriched desorbate. This desorbate is stripped of toluene desorbent to produce a 2,6-DMN enriched fraction. This enriched fraction is then ready for crystallization to recover 2,6-DMN.

Figure 2:
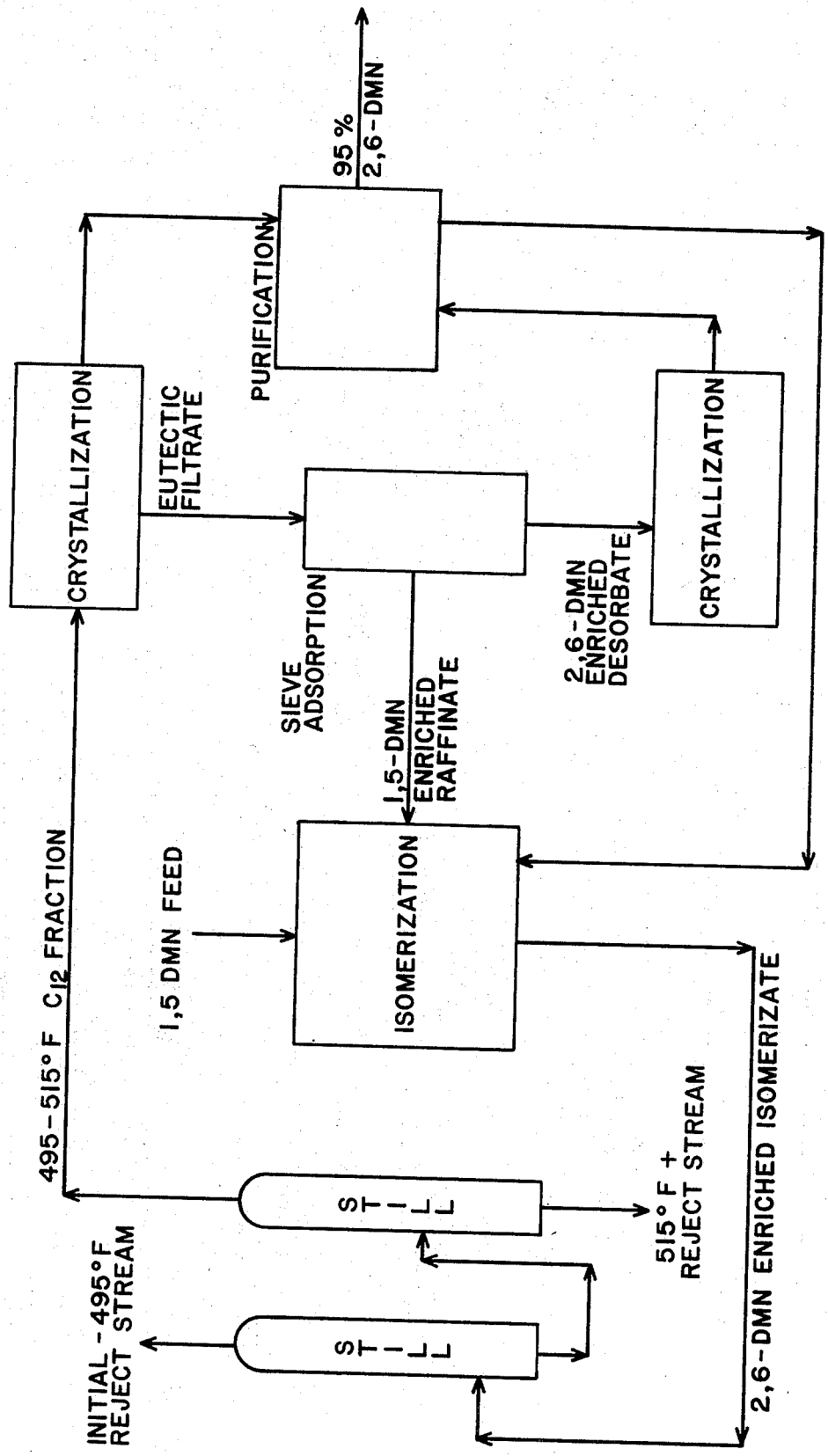

The accompanying FIG. 2 illustrates the production of substantially pure 2,6-DMN by the use of an isomerization process (as for converting 1,5- and 1,6-DMN to 2,6-DMN) such as in my application Ser. No. 207,870, in combination with the molecular sieve "Eutectic Breaking" adsorption process described herein. The feed to this process can be any hydrocarbon stream which is rich in dimethylnaphthalenes (or in alkylnaphthalenes which can be transformed, as by disproportionation, into DMN's), but preferably is a stream which is rich in 1,5-DMN or in 1,5- and 1,6-DMN. One source of such a feed is found in U.S. 3,244,758 of Eberhardt, which shows the preparation of 1,5-DMN from o-xylene and butadiene. As noted in Ser. No. 207,870, the usual isomerization processes for production of 2,6-DMN require a feed rich in 1,5- or 1,6-DMN or both. That is, the other 7 of the 10 DMN isomers cannot be readily converted by isomerization into 2,6-DMN because of energy barriers [see J. Org. Chem. 29:2939 (1964)].

In the FIG. 2 a feed comprising 1,5-DMN is distilled to produce a $C_{12}$ fraction boiling in about the 495–515° F. range which is rich in 2,6-DMN and 1,5-DMN, and contains a large amount of 1,6-DMN (e.g., 35–70% 1,6-DMN, typically 45%), an overhead boiling below about 475° F. and a bottoms reject (which is rich in 2,6-DMN, a typical analysis being 45% 2,6-DMN, 45% 1,6-DMN, 10% 1,5-DMN) is fed to a crystallizer (at about 70° F.) to obtain 2,6-DMN rich crystals and a 2,6-DMN "lean" filtrate which contains 1,5- and 2,6-DMN in eutectic proportions (and 1,6-DMN). The 2,6-DMN rich crystals are further purified (as by recrystallizing) and substantially pure 2,6-DMN (e.g., 95%) is recovered.

The filtrate from the crystallizer is essentially eutectic with respect to 2,6-DMN and 1,5-DMN, and also contains 1,6-DMN. The eutectic filtrate can be passed through an adsorbent bed, not shown (e.g., attapulgite clay, bauxite, carbon, etc.), to remove impurities which might damage the molecular sieve adsorbent. The eutectic filtrate or clay-treated eutectic filtrate is fed into an adsorbent "Eutectic Breaking" column containing a molecular sieve adsorbent which is selective for 2,6-DMN. The adsorbent preferentially adsorbs 2,6-DMN. The raffinate from the column is rich in 1,5-DMN and 1,6-DMN and is passed to an isomerization reactor to produce a 2,6-DMN enriched isomerizate. This isomerizate is then sent to crystallization. The 2,6-DMN-rich adsorbent is stripped with a desorbent (e.g., toluene) and a 2,6-DMN rich desorbate fraction is removed. This desorbate fraction is further processed by crystallization (at about 0° C.) to recover 2,6-DMN which is passed to the purification step (which can be a recrystallization, as from a solvent).

The molecular sieve adsorption and desorption steps can be done in a "continuous" manner as described in FIG. 1.

ILLUSTRATIVE EXAMPLES

Example 1

Potassium Type L zeolite was used to selectively adsorb 2,6-DMN from a eutectic mixture with 1,5-DMN.

Prior to evaluation the sieve was carefully conditioned for two days in moist (ambient) air at 125° C., to control the water content of the sieve. A batch adsorption was then run in which solution containing 3.3 g. of 2,6-DMN, 6.7 g. of 1,5-DMN and 10.0 g. iso-octane, and 5.0 g. of the Type L sieve were held at 100° C. for one hour to insure equilibration between the raffinate and the adsorbate. The 1,5-DMN was 97% pure, the remaining 3 wt. percent being 1,5-dimethyltetralin (1,5-DMT). The unadsorbed (raffinate) fraction was then filtered off and the cooled sieve washed with room temperature iso-octane to remove the remainder of the unadsorbed fraction. The adsorbate was removed with refluxing (65° C.) methanol. The results of these evaluations are shown in Table 1 as follows:

TABLE 1

| | Total weight | Percent | | |
| --- | --- | --- | --- | --- |
| | | 1,5-DMT | 2,6-DMN | 1,5-DMN |
| Unadsorbed fraction | 8.80 | 2.0 | 32.5 | 65.5 |
| Adsorbed fraction | 1.04 | 1.0 | 38.8 | 60.2 |

These results show that potassium L zeolite is selective for adsorption of 2,6-DMN, from 1,5-DMN, as shown by the separation ($\alpha$) factor of 1.3, where $$\alpha = \frac{2,6\text{-DMN adsorbed}/2,6\text{-DMN unadsorbed}}{1,5\text{-DMN adsorbed}/1,5\text{-DMN unadsorbed}}$$

This separation factor of 1.3 is better than can be obtained by distillation.

My application Ser. No. 7,273 discloses that Type L sieve adsorbs 2,6-DMN in preference to 2,7-DMN, the reverse of all other sieves shown in that application or in the prior art.

The feed to the adsorption step can be in liquid, vapor or mixed liquid/vapor phase. However, the large volume of desorbent required to remove the 2,6-DMN makes vapor phase separation economically unattractive in comparison with liquid phase separation. Pressure-sweep cycles (e.g., alternating high and low pressures) can be used (particularly in conjunction with the more polar desorbant, as ammonia or organic amines) to improve the desorption step.

Example 2

Example 1 was repeated except that the potassium Type L zeolite (available commercially under the trade name Linde SK 45) was conditioned (or activated) for about 12 hours at 450° C. Substantially the same results were obtained as in Example 1.

Example 3

Example 1 was repeated except that the zeolite was Sodium Type Y (available commercially under the trade name Linde SK 40).

1,5-DMN was selectively adsorbed by the NaY zeolite (as can be seen in the following Table 2:

TABLE 2

| | Mole percent | | |
| --- | --- | --- | --- |
| | 1,5-DMT | 2,6-DMN | 1,5-DMN |
| Unadsorbed fraction | 1.7 | 34.9 | 63.4 |
| Adsorbed fraction | 0.5 | 12.0 | 87.4 |

Analysis of the adsorbed fraction also showed about 0.1 mole percent of 2,7-DMN. Therefore, Type Y zeolite can be used to selectively remove very small quantities of 2,7-DMN if present as an impurity with other DMN's (such as 2,6-DMN).

The separation factor ($\alpha$) for 1,5-DMN from 2,6-DMN was 4.0.

In the process shown in FIG. 2, a Type Y zeolite can be used if modified so that the absorbate is recycled back to the isomerization step and the raffinate is sent to the crystallization step.

The following Table 3 shows the loss on ignition at about 1900° F.:

TABLE 3

| Zeolite | Condition temp. (° C.) | Percent loss |
| --- | --- | --- |
| K Type L | 125 | 8.74 |
| Do | 450 | 0.92 |
| Na Type Y | 125 | 13.85 |

The capacity per 100 g. of the zeolite for the adsorbed fraction was 7.8 g.

In these examples the zeolite was in finely powdered form and the agitation (stirring) was used during the contacting period. Unless otherwise noted, all percentages in this application are by weight.

The potassium Type L zeolite used in Examples 1 and 2 had the following analysis (on an anhydrous basis):

|  | Wt. percent |
|---|---|
| $SiO_2$ | 63.73 |
| $Al_2O_3$ | 18.24 |
| $K_2O$ | 14.53 |

The difference in cation content (to provide electronic equivalency) is believed to be primarily satisfied by sodium (about 3% $Na_2O$) and perhaps, a small proportion of protonic sites. The zeolite on a fully hydrated basis (at 25° C.) contained 14.59% water.

The invention claimed is:

1. Process for separating 2,6-dimethylnaphthalene from 1,5-dimethylnaphthalene, said process comprising:
    (A) contacting a fluid feed mixture comprising said 2,6- and 1,5-dimethylnaphthalenes with a solid adsorbent comprising a partially dehydrated, substantially crystalline alumino-silicate zeolite having a critical pore diameter greater than about 6 A., the ratio Al/Si of the alumino-silicate framework of the zeolite being in the range of 0.2–0.65, whereby there is obtained a rich adsorbent containing an adsorbate which is richer in one said dimethylnaphthalene than was said fluid feed mixture, and a raffinate product which contains less of the one said dimethylnaphthalene than did said fluid feed mixture;
    (B) separating said raffinate product from said rich adsorbent and,
    (C) removing the one said dimethylnaphthalene from said rich adsorbent.

2. Process according to claim 1 wherein from 25–100% of the electronegativity associated with the alumino-silicate framework of said zeolite is satisfied by cations of metals.

3. Process according to claim 2 wherein said cations of metals comprise one or more of the rare earths, lanthanium, lithium, sodium, potassium, calcium, magnesium, barium or mixtures of two or more such cations.

4. Process according to claim 1 wherein said substantially crystalline alumino-silicate zeolite is at least 50% crystalline by X-ray, compared to a fully hydrated pure specimen of said zeolite, and wherein there is a loss of 2–18 weight percent water upon ignition analysis of said zeolite at 1900° F.

5. Process according to claim 4 wherein said loss of water upon ignition analysis is about 12 weight percent.

6. Process according to claim 1 wherein said fluid mixture is contacted in liquid phase.

7. Process according to claim 6 wherein said ratio Al/Si is in the range of 0.2–0.35 and wherein said critical pore diameter is in the range of 6.5–13 A.

8. Process according to claim 1 wherein 2,6-dimethylnaphthalene is separated from 1,5-dimethylnaphthalene by preferential adsorption of said 2,6-dimethylnaphthalene on a Type L zeolite.

9. Process for the production of 2,6-dimethylnaphthalene (2,6-DMN) comprising the steps of
    (A) catalytic isomerization of 1,5-dimethylnaphthalene (1,5-DMN) to an isomerizate containing 2,6-DMN and 1,5-DMN in a mole ratio 2,6-DMN/1,5-DMN of greater than 1:2;
    (B) crystallization of the isomerizate to recover 2,6-DMN and to produce a mother liquor containing 2,6-DMN and 1,5-DMN in about eutectic proportions;
    (C) adsorption of said mother liquor on a crystalline alumino-silicate zeolite adsorbent which is selective for 2,6-DMN and obtaining a raffinate fraction which is rich in 1,5-DMN;
    (D) isomerization of said raffinate fraction to convert 1,5-DMN to 2,6-DMN;
    (E) stripping the adsorbent with a desorbent to produce a 2,6-DMN rich desorbate fraction; and,
    (F) crystallization of said 2,6-DMN rich desorbate fraction to recover 2,6-DMN.

10. Process of claim 9 wherein the framework of said zeolite adsorbent has a ratio Al/Si in the range of 0.2–0.65.

11. Process of claim 9 wherein said zeolite adsorbent has a ratio Al/Si in the range of 0.2–0.35.

12. Process of claim 9 wherein said zeolite is a Type L zeolite in which at least 50% of the electronic equivalency of the alumino-silicate framework is satisfied by cations of potassium.

13. Process of claim 9 wherein said isomerizate of said step (A) contains in the range of 30–60% 1,6-dimethylnaphthalene.

References Cited
UNITED STATES PATENTS

| | | | |
|---|---|---|---|
| 3,336,411 | 8/1967 | Benham | 260—668 |
| 3,558,732 | 1/1971 | Neuzil | 260—674 |
| 3,133,126 | 5/1964 | Fleck et al. | 260—674 |
| 3,668,267 | 6/1972 | Hedge | 260—674 |

DELBERT E. GANTZ, Primary Examiner

C. E. SPRESSER, Jr., Assistant Examiner

U.S. Cl. X.R.

260—668 A, 668 F, 674 N